United States Patent [19]

Yasukuni et al.

[11] 4,256,372

[45] Mar. 17, 1981

[54] CATADIOPTRIC LENS SYSTEM WITH LIGHT TRANSMISSION CONTROL MEANS

[75] Inventors: Mitsuo Yasukuni, Sakai; Hiroshi Kiten, Mino; Takashi Iida; Kunio Kawamura, both of Sakai; Nobuo Yoshida, Hachioji, all of Japan

[73] Assignee: Minolta Camera Kabushiki Kaisha, Osaka, Japan

[21] Appl. No.: 947,737

[22] Filed: Oct. 2, 1978

[30] Foreign Application Priority Data

Oct. 3, 1977 [JP] Japan .................. 52/131482[U]

[51] Int. Cl.³ .............. G02B 17/08; G02B 5/22; G03B 9/56
[52] U.S. Cl. .................. 350/444; 350/439; 350/357; 354/227; 354/271
[58] Field of Search .......... 354/227, 271; 350/357, 350/195, 199, 196, 205, 314

[56] References Cited

U.S. PATENT DOCUMENTS

| Re. 28,199 | 10/1974 | Deb et al. ................. 350/357 |
| 3,578,843 | 5/1971 | Castellion ................. 350/357 |
| 4,054,890 | 10/1977 | Shimomura ............... 354/227 |
| 4,066,335 | 1/1978 | Courtney et al. .......... 354/227 |
| 4,068,928 | 1/1978 | Meyers ..................... 350/357 |
| 4,106,855 | 8/1978 | Coon ......................... 350/196 |

Primary Examiner—Conrad J. Clark
Attorney, Agent, or Firm—Jackson, Jones & Price

[57] ABSTRACT

A catadioptric light system such as a module lens system capable of being mounted on a camera is provided. A plurality of light reflecting and refracting optic members are designed to provide a desired image forming light path through the lens system. Disposed within the lens system is an electrochromic device that is responsive to an applied voltage to provide a predetermined degree of light transmission intensity through the lens system. The electrochromic device can be a thin film mounted on a transparent plate or on a reflective surface. The housing of the lens system can be advantageously designed to contain its own power source.

13 Claims, 6 Drawing Figures

CATADIOPTRIC LENS SYSTEM WITH LIGHT TRANSMISSION CONTROL MEANS

BACKGROUND OF THE INVENTION

1. Field of the Invention

The present invention relates to a catadioptric lens system which forms an image by means of a plurality of light reflecting and refracting surfaces. The catadioptric lens system is basically constructed as a form of reflecting telescope and is used as an exchangeable objective lens for a camera.

2. Description of the Prior Art

It is well known that the catadioptric lens system is almost incapable of being provided with a conventional iris diaphragm for controlling the light transmission through the lens system by means of stopping-down the iris diaphragm. This is because of the complex light path in the system, bulkiness of the construction and the problem of cost.

The conventional catadioptric lens system, accordingly, adopts a plurality of ND (neutral density) filters of various light transmission, one of the ND filters being exchangeably inserted in the lens system at the image side end portion thereof to control the light transmission through the lens system by means of attenuating light passing through the ND filter. The disadvantage of such a conventional catadioptric lens system is that a great number of various ND filters have to be prepared if gradual steps of change in light transmission are desired. Additionally, it is troublesome for a user to select one of the great number of ND filters and exchange the one for another. On the contrary, a limited number of available ND filters can only realize a sudden change in light transmission per one step of exchange of ND filters.

U.S. Pat. No. 4,054,890 is cited in that a general light control by means of electrochromic device is disclosed. The electrochromic device, however, is used in the patent to form a shutter or an iris diaphragm type aperture stop for a lens system of a conventional camera lens system.

SUMMARY OF THE INVENTION

An object of the present invention is to provide a catadioptric lens system with an improved light transmission control means.

An object of the present invention is to provide a catadioptric lens system capable of gradual change in light transmission through the system without a troublesome manner of operation.

A further object of the present invention is to provide a catadioptric lens system capable of a gradual change in light transmission through the lens system in a simplified manner. The catadioptric lens system of the present invention provides a plurality of light refracting surfaces and light reflecting surfaces to provide an image forming light path. Mounted within this light path and forming a part thereof is an optical member including a film of an electrochromic material that is capable of being predeterminedly attenuated to control the desired intensity of light transmission. This optical member can be of a light reflective material or can be transmissive to light. Appropriate electrical circuitry can be provided to insure the proper voltage level and application time to effect the appropriate desired light transmission. By reversing the application of voltage on the electrochromic device, the light transmission capability can be returned to its maximum extent. A variable resistor-capacitor timing circuit can bias appropriate transistors to assure a definite level of light transmission. A power source, such as batteries, are advantageously self-contained within the housing of the catadioptric lens system.

DETAILED DESCRIPTION OF THE PREFERRED EMBODIMENTS

The invention will hereinafter be described in detail by way of the embodiments illustrated on the accompanying drawings.

Figure 1:
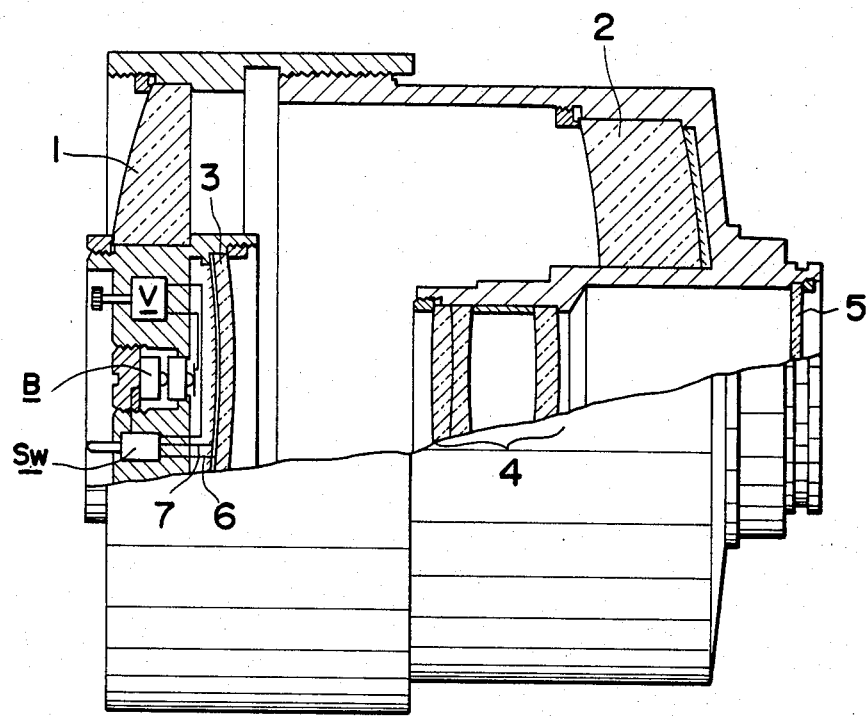
FIG. 1 represents a partial cross sectional view of an embodiment of the present invention.

FIG. 1 is a view showing an embodiment of this invention. It is well known that, in a catadioptric lens system, light enters a lens system from a ring-shaped lens (1), is reflected by a mirror lens (2) which acts as a main mirror and, then, by another mirror lens (3) which acts as a second mirror, passes through a lens (4) and a chromatic filter (5) and finally reaches a film plane. The chromatic filter (5) is removably mounted on the lens system and replaceable with another chromatic filter or a transparent plate for compensating the back focal distance.

In this particular embodiment, the mirror lens (3) is provided with an electrochromic device (ECD) on its reflective surface so that by varying the light transmissivity of the electrochromic device, the index of reflection of the mirror lens (3) may be varied and, accordingly, the quantity of light may be adjusted.

Figure 2:
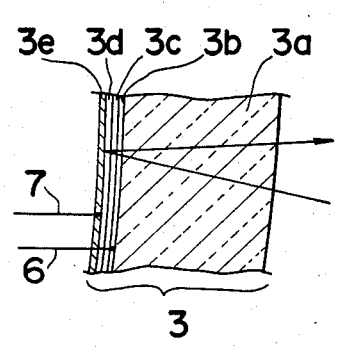
FIG. 2 represents an enlarged sectional view of a portion of the embodiment in FIG. 1.

FIG. 2 is a partial cross sectional view showing the mirror lens (3) on an exaggerated scale, the lens body being indicated at (3a). As coated on the back side of said lens (3a), there are provided a transparent electrode film (3b) about 1500 Å thick which is a negative electrode, a $WO_3$ film (3c) about 2500 Å thick, a $S_iO_2$ film (3d) about 1500 Å thick which is an insulating layer and a metallic film (3e), such as an Ag or Au or Al film, which serves both as a positive electrode and a reflecting surface in the successive layers and in the order mentioned. In this manner, the electrochromic device is disposed on the light reflecting surface of mirror lens (3). Indicated by the reference numerals (6) and (7) are schematically illustrated lead wires from said transparent electrode film (3b) and metallic film (3e), respectively.

When a direct current voltage of about several volts is applied between said transparent electrode film (3b) and metallic film (3e) through leads (6) and (7), the light transmissivity of the $WO_3$ film (3c) is reduced by a magnitude commensurate with the magnitude of the applied voltage and with the time during which the voltage is applied so that the reflectivity of the mirror lens (3) with respect to the light reflecting from the mirror lens as indicated by the arrowmark is varied, thus enabling one to obtain the desired light control. Referring to FIG. 1, (B) (V), and (Sw), taken together, denote a power supply for controlling the voltage applied to leads (6) and (7), which is disposed in the central cavity of a ringshaped lens (1), the region which has not been utilized in the conventional catadioptric telephoto lens.

The voltage of the battery (B) is adjusted by the variable resistor (V) and applied to leads (6) and (7) via the switch (SW). Therefore, the quantity of light can be continuously and quickly controlled by adjusting the variable resistor (V).

Figure 3:
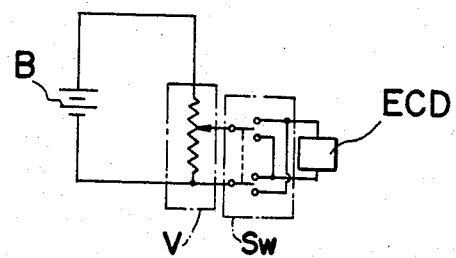
FIG. 3 represents a circuit diagram showing an example of control circuit used in the present invention.

FIG. 3 shows an exemplary circuitry suited for an embodiment incorporating an electrochromic device of storage type. Since, with this type, the light transmissivity, once reduced, is retained at that reduced level, the applied voltage may be removed by turning off the switch (SW) if the transmissivity is desirable. An inverse voltage is applied by changing-over the switch (SW) if it is required to restore the initial transmissivity.

Figure 4:
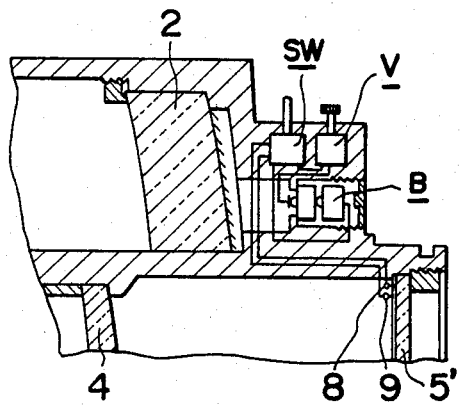
FIG. 4 represents a cross sectional view of a part of another embodiment of the present invention.

FIG. 4 is a partial cross-section view showing another embodiment of this invention. Thus, an electrochromic device of the described type is disposed on an exchangeable chromatic filter (5') or a transparent plate for compensating the back focal distance which may be substituted therefor.

The power unit comprising (B), (V) and (SW) is disposed in the rear of the lens and connected to the electrochromic device of the chromatic filter (5') by means of disconnectable contacts (8) and (9).

Figure 5:
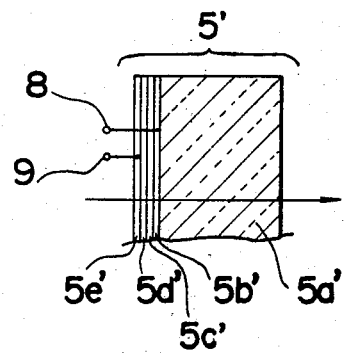
FIG. 5 represents an enlarged sectional view of a portion of the embodiment in FIG. 4.

FIG. 5 is a view showing a portion of the chromatic filter (5') on exaggerated scale, the chromatic filter body being indicated at (5a'). Coated on this chromatic filter body (5a') are a transparent electrode film (5b'), a WO₃ film (5c'), a SiO₂ film (5d') and a transparent electrode film (5e') which are disposed in successive layers and in the order mentioned. In this embodiment, the rate of transmission of light through the chromatic filter (5') as indicated by the arrowmark is varied, thus permitting the desired light control. The chromatic filter is exchangeable for another chromatic filter (or transparent plate) of substantially the same structure as in FIG. 5. Therefore, each chromatic filter or a transparent plate for compensating the back focal distance substitutable therefor is provided with said electrochromic device and, in mounting the filter, it is connected to the power supply (B), (V), (SW) by way of said contacts (8) and (9). It may be possible that a filter is provided with an electrochromic device on either side, in lieu of one side alone.

Because, in the present invention, an electrochromic device is disposed to transverse the total effective light beam of the optical path and the quantity of light is controlled by varying the light transmissivity of said electrochromic device, continuous and quick light control in a catadioptric lens is now made feasible.

It should also be understood that when, as in the embodiment illustrated in FIGS. 1 and 2, the electrochromic device is provided on a reflecting mirror of the lens system, its reflective surface may be utilized as one of the electrodes. On the other hand, when each interchangeable chromatic filter or a transparent plate for compensating the back focal distance which is substitutable therefor is provided with said electrochromic device, it is no longer necessary that one resort to the two independent procedures of changing the conventional ND filter for light control and the chromatic filter for chromatic control and, moreover, the desired light control can be continuously obtained. Furthermore, since the lens barrel of catadioptric lens system by its inherent construction, leaves much space unused, the power supply for the electrochromatic device can be installed in such available space. This means that, even though the electrochromic device is used for light control, it is neither necessary to increase the size of the lens barrel nor is it necessary to mount the power supply on the camera side.

As already described, the light transmission of the electrochromic device is variable in dependence on a voltage applied to the electrochromic device and on a time during which the voltage is applied. This will be understood from the following numerical example with respect to the structure of the first embodiment in FIG. 2.

| Time (sec.)   | 0   | 0.5 | 1  | 2 | 3   | 5    |
|---------------|-----|-----|----|---|-----|------|
| Intensity (%) | 100 | 37  | 13 | 2 | 0.5 | 0.04 |

Above table shows the change in intensity of light reflected from metallic film (3e) of FIG. 2 in accordance with the lapse of time after the initiation of the voltage application to the electrochromic device. In case of the above table, applied voltage is 3 volts. The change in intensity is represented by a relative value with respect to a standard of 100, which corresponds to the greatest light transmission of the electrochromic device. The change in relative intensity also depends on the voltage applied to the electrochromic device, e.g., the relative intensity is 52 percent after the lapse of 5 seconds in case that the applied voltage is 2 volts. As apparent from the above example, the light reflection from the metallic film (3e) can be set by determining the voltage to be applied to the electrochromic device and determining the time period during which the voltage is applied.

Figure 6:
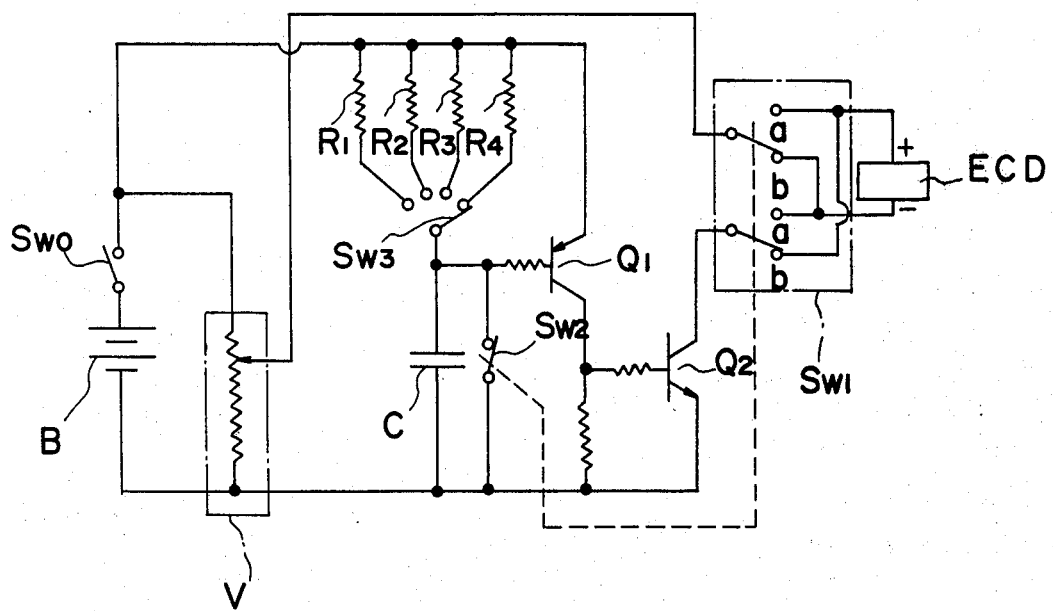
FIG. 6 represents a circuit diagram showing another example of control circuit used in the present invention.

FIG. 6 represents an example of a circuit for the purpose of the above control of the electrochromic device. In the Figure, the voltage to be applied to the electrochromic device ECD is predetermined by adjusting variable resistor V. When main switch Sw₀ is closed, a negative voltage is applied to ECD since transistors Q₁ and Q₂ are conductive with switch Sw₂ closed and switch Sw₁ is connected to b side contacts as shown in FIG. 6. In this condition, the light transmission of ECD is of the greatest value to result in the greatest light reflection on metallic film (3e) in FIG. 2. If the light reflection on metallic film (3e) is desired to be attenuated, switch Sw₃ is first operated to select one of resistors R₁ to R₄, e.g., R₄ as in FIG. 6, and then switch Sw₂ is opened to begin the charging on capacitor C through R₄. At the same time, switch Sw₁, which is in association with switch Sw₂, is changed to connect a side contacts. Therefore, a positive voltage is applied to ECD to reduce the light transmission of ECD. In response to this, the light reflection on metallic film (3e) is gradually attenuated with the progress of time. After a time lapse determined by the time constant C.R₄ of capacitor C and resistor R₄, transistor Q₁ is changed to be nonconductive to also change the transistor Q₂ nonconductive. Therefore, the application of the positive voltage to ECD is stopped to interrupt the change in light transmission of ECD. The light transmission at this time is maintained afterwards. Thus, the setting of light transmission of ECD is completed.

If the setting of light transmission of ECD is desired to be altered, switch Sw₂ is closed, which discharges capacitor C to change transistors $Q_1$ and $Q_2$ conductive again. In this condition, switch $Sw_1$ is also changed back to b side contacts. Thus, a negative voltage is again applied to ECD to achieve the greatest light transmission. Then, the resistor selection by switch $Sw_3$ is altered to change the time constant. And switch $Sw_2$ is opened again to repeat the first mentioned operation.

If the setting of the light transmission of ECD is desirable, main switch $Sw_0$ can be opened because ECD in FIG. 6 is of a storage type which maintains the light transmission characteristic after the applied voltage is removed.

It is needless to say that the number of resistors $R_1$ to $R_4$ may be increased if more than four steps of change in the light transmission of ECD are desired. Alternatively, resistors $R_1$ to $R_4$ may be replaced by one variable resistor to continuously vary the time constant.

What is claimed is:

1. A self-contained electronic light attenuating catadioptric lens system for a camera comprising:
   a lens barrel;
   means for exchangeably mounting the catadioptric lens system on a camera;
   a plurality of light reflecting surfaces mounted in the lens barrel;
   a plurality of light refracting surfaces mounted in the lens barrel;
   an electrochromic device in the lens barrel for variably attenuating the light transmission through the lens system, whereby the light reflecting and refracting surfaces define an optical path for forming an image of an object and the electrochromic device operatively interfaces with the optical path; and
   electric circuit means including a power source for controlling the electrochromic device, the electric circuit means being located in the lens barrel.

2. The invention of claim 1 further comprising means for applying voltage to the electrochromic device and means for variably determining a time during which the voltage is applied.

3. The invention of claim 1, wherein the catadioptric lens system includes a ring shaped lens with a central aperture, a main mirror for reflecting light rays toward the object side and a second mirror for reflecting the light rays from the main mirror toward the image side, and wherein the electric circuit means is located at a space next to the rear side of the second mirror within the central aperture.

4. The invention of claim 3, wherein the film of electrochromic device is mounted on the second mirror.

5. An improved self-contained electronic catadioptric lens system adapted for removable mounting as a lens module on a camera housing comprising;
   a lens barrel body member of approximately the configuration of a conventional camera lens non-electronic catadioptric lens system;
   a plurality of light reflecting and refracting optical elements forming a non-linear optical path through the lens module for transmitting the image of an object including a first ring-shaped lens with a central aperture, a first mirror member having an object side reflecting surface and a second mirror member having an image side reflecting surface adjacent the first ring-shaped lens;
   an electrochromic device, uniformly intersecting the effective image forming light path and mounted within the body member, having a variable light transmission characteristic;
   circuit means for varying the light transmission characteristic of the electrochromic device to a predetermined value of light intensity passing therethrough including control means mounted on the body member for providing a plurality of predetermined values of light intensity and a battery receptacle mounted directly in the body member for receiving at least one battery to power the circuit means.

6. The invention of claim 5 further comprising a light transmitting plate, the electrochromic device being formed on a surface of the light transmitting plate.

7. The invention of claim 6, wherein the light transmitting plate is an exchangeable chromatic filter.

8. The invention of claim 6, wherein the light transmitting plate is a transparent plate for compensating the back focal distance of the lens system.

9. The invention of claim 5 wherein the control means are mounted concentrically on the object side of the ring-shaped lens to extend within the ring-shaped lens aperture.

10. The invention of claim 9 wherein the control means includes a variable resistor for adjusting the quantity of light transmitted through the electrochromic device.

11. The invention of claim 9 wherein the battery receptacle is mounted within the ring-shaped lens aperture and on the object side of the second mirror member.

12. The invention of claim 5 wherein the control means is mounted on the lens barrel body member on the image side of the first mirror member.

13. The invention of claim 5 wherein the control means further comprises means for applying voltage to the electrochromic device and means for variably determining a time during which the voltage is applied.

* * * * *